(12) United States Patent
Kuo et al.

(10) Patent No.: US 9,149,948 B2
(45) Date of Patent: Oct. 6, 2015

(54) MACHINE FOR AUTOMATICALLY CUTTING AND SORTING BOXES AND REMANTS

(75) Inventors: Chien-Kuan Kuo, New Taipei (TW); Chun-Huang Huang, New Taipei (TW)

(73) Assignee: GOLDEN ARROW PRINTING, CO., LTD., New Taipei (TW)

( * ) Notice: Subject to any disclaimer, the term of this patent is extended or adjusted under 35 U.S.C. 154(b) by 720 days.

(21) Appl. No.: 13/571,660

(22) Filed: Aug. 10, 2012

(65) Prior Publication Data

US 2014/0041498 A1 Feb. 13, 2014

(51) Int. Cl.
| | |
|---|---|
| *B65G 47/91* | (2006.01) |
| *B26D 7/06* | (2006.01) |
| *B26D 7/18* | (2006.01) |
| *B25J 9/00* | (2006.01) |
| *B25J 15/06* | (2006.01) |

(52) U.S. Cl.
CPC ............... *B26D 7/06* (2013.01); *B25J 9/0084* (2013.01); *B25J 15/0616* (2013.01); *B26D 7/18* (2013.01); *Y10T 83/2183* (2015.04); *Y10T 83/2185* (2015.04)

(58) Field of Classification Search
CPC ............ Y10T 83/2185; Y10T 83/2192; B26D 7/1863; B26D 7/18; B26D 7/018; B26D 7/20; B26D 7/0625; B26D 7/0633; B26D 2007/0068; B25J 15/0616
USPC .................................................... 83/152, 151
See application file for complete search history.

(56) References Cited

U.S. PATENT DOCUMENTS

| | | | | |
|---|---|---|---|---|
| 4,067,458 | A * | 1/1978 | Schneider et al. | 414/796.7 |
| 4,627,785 | A * | 12/1986 | Monforte | 414/730 |
| 4,723,353 | A * | 2/1988 | Monforte | 483/10 |
| 5,899,341 | A * | 5/1999 | Irita | 209/571 |
| 7,581,636 | B2 * | 9/2009 | Martinez | 198/690.1 |
| 8,453,547 | B2 * | 6/2013 | Meyer et al. | 83/13 |
| 8,826,787 | B2 * | 9/2014 | Hoover et al. | 83/100 |
| 9,008,841 | B2 * | 4/2015 | Fuhlbrigge et al. | 700/253 |
| 2004/0050225 | A1 * | 3/2004 | Steiner | 83/13 |
| 2004/0231480 | A1 * | 11/2004 | Wattles et al. | 83/401 |
| 2008/0264758 | A1 * | 10/2008 | Katsuyama | 198/346.2 |
| 2009/0263218 | A1 * | 10/2009 | Katsuyama | 414/225.01 |
| 2010/0018368 | A1 * | 1/2010 | Meyer et al. | 83/13 |

* cited by examiner

*Primary Examiner* — Andrew M Tecco
(74) *Attorney, Agent, or Firm* — Chun-Ming Shih; HDLS IPR Services

(57) ABSTRACT

The machine of the invention includes a cutting device, a first conveyor, a second conveyor, a first moving arm and a second moving arm. The cutting device includes a platform, a lower mold on the platform and an upper mold correspondingly over the lower mold. The first conveyor is disposed near one side of the platform for conveying boxes to be cut. The second conveyor is disposed near the other side of the platform for conveying cut boxes and remnants. The first moving arm includes a first transmission and a first robot hand driven thereby for moving the boxes to be cut to a position between the lower mold and the upper mold. The second moving arm includes a second transmission and a second robot hand driven thereby for moving the cut boxes and remnants to the second conveyor.

13 Claims, 12 Drawing Sheets

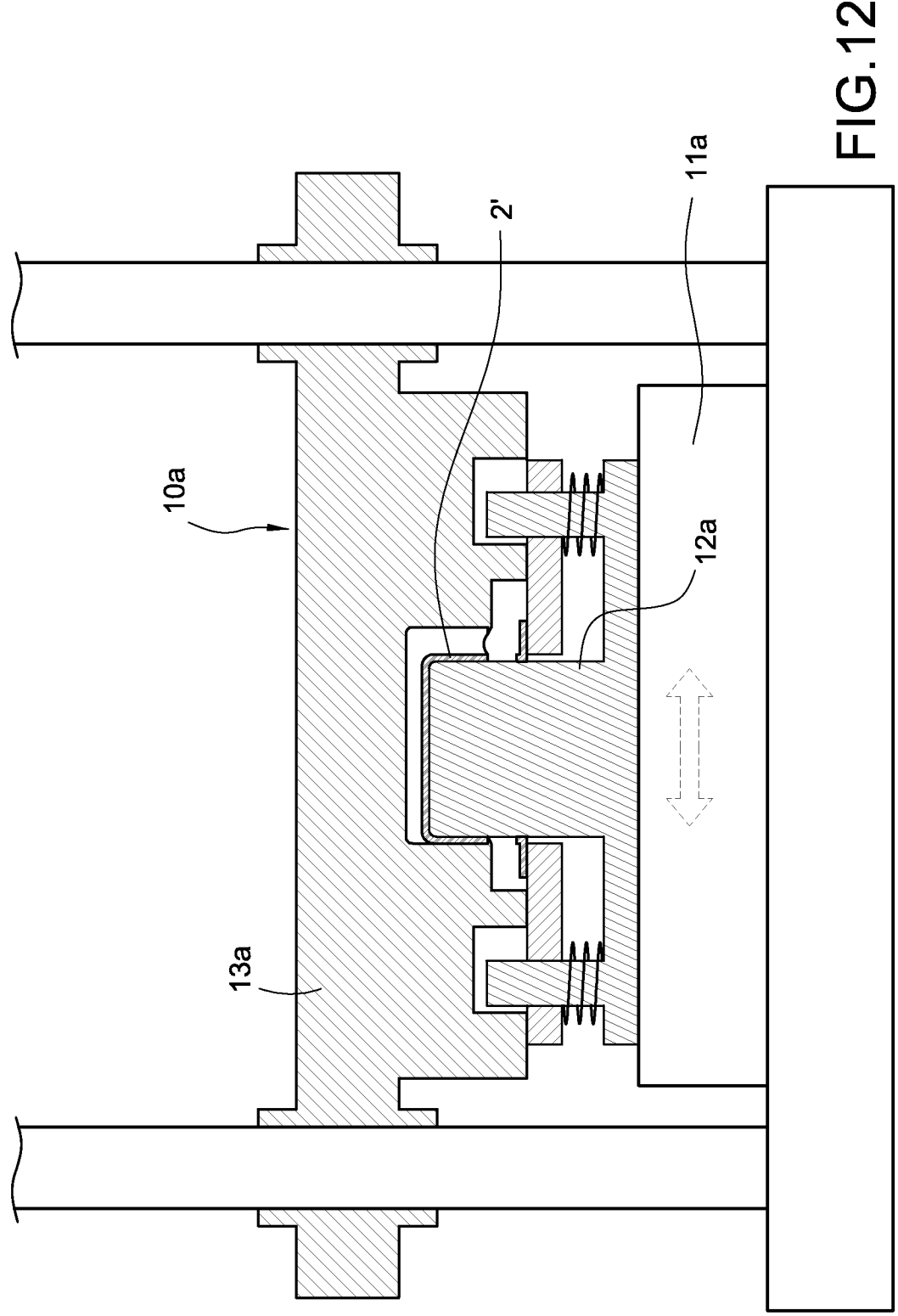

MACHINE FOR AUTOMATICALLY CUTTING AND SORTING BOXES AND REMANTS

BACKGROUND OF THE INVENTION

1. Technical Field

The invention relates to box cutting machines, particularly to automatic box cutting machines.

2. Related Art

In modern society, packing of commercial products is as important as the product itself Currently, packing boxes of products are made by machines, such as injection or extrusion. Although such manufacture methods can achieve the object of mass production, an edge of opening of a packing box tends to be irregular. Thus, machine-manufactured packing boxes are usually needed to be cut for a desired size and removing an irregular edge.

Currently, cutting of packing boxes is performed by manually taking a box to be cut and then putting it in a cutting machine. However, such a process not only costs much labor and time, but also causes a potential risk to an operator which takes a box to put in a cutting machine.

SUMMARY OF THE INVENTION

An object of the invention is to provide a machine for automatically cutting and sorting boxes and remnants, which can improve operation efficiency of box cutting process and reduce labor loading.

To achieve the above object, the machine of the invention includes a cutting device, a first conveyor, a second conveyor, a first moving arm and a second moving arm. The cutting device includes a platform, a lower mold on the platform and an upper mold correspondingly over the lower mold. The first conveyor is disposed near one side of the platform for conveying boxes to be cut. The second conveyor is disposed near the other side of the platform for conveying cut boxes and remnants. The first moving arm includes a first transmission and a first robot hand driven thereby for moving the boxes to be cut to a position between the lower mold and the upper mold. The second moving arm includes a second transmission and a second robot hand driven thereby for moving the cut boxes and remnants to the second conveyor.

Another object of the invention is to provide a machine for automatically cutting and sorting boxes and remnants, which does not need to manually move boxes into a cutting machine so that it makes the cutting process safer than ever.

The invention uses two moving arms to move boxes to be cut, cut boxes and remnants and to unload the cut boxes and remnants. Manual operation is completely replaced with an automatic machine. Thus cutting time and labor can be effectively reduced without any risk. Further, the invention also can sort the cut boxes and remnants.

BRIEF DESCRIPTION OF THE DRAWINGS

FIG. 12 is another schematic view showing the cutting action of the cutting device shown in FIG. 10.

DETAILED DESCRIPTION OF THE INVENTION

Figure 1:
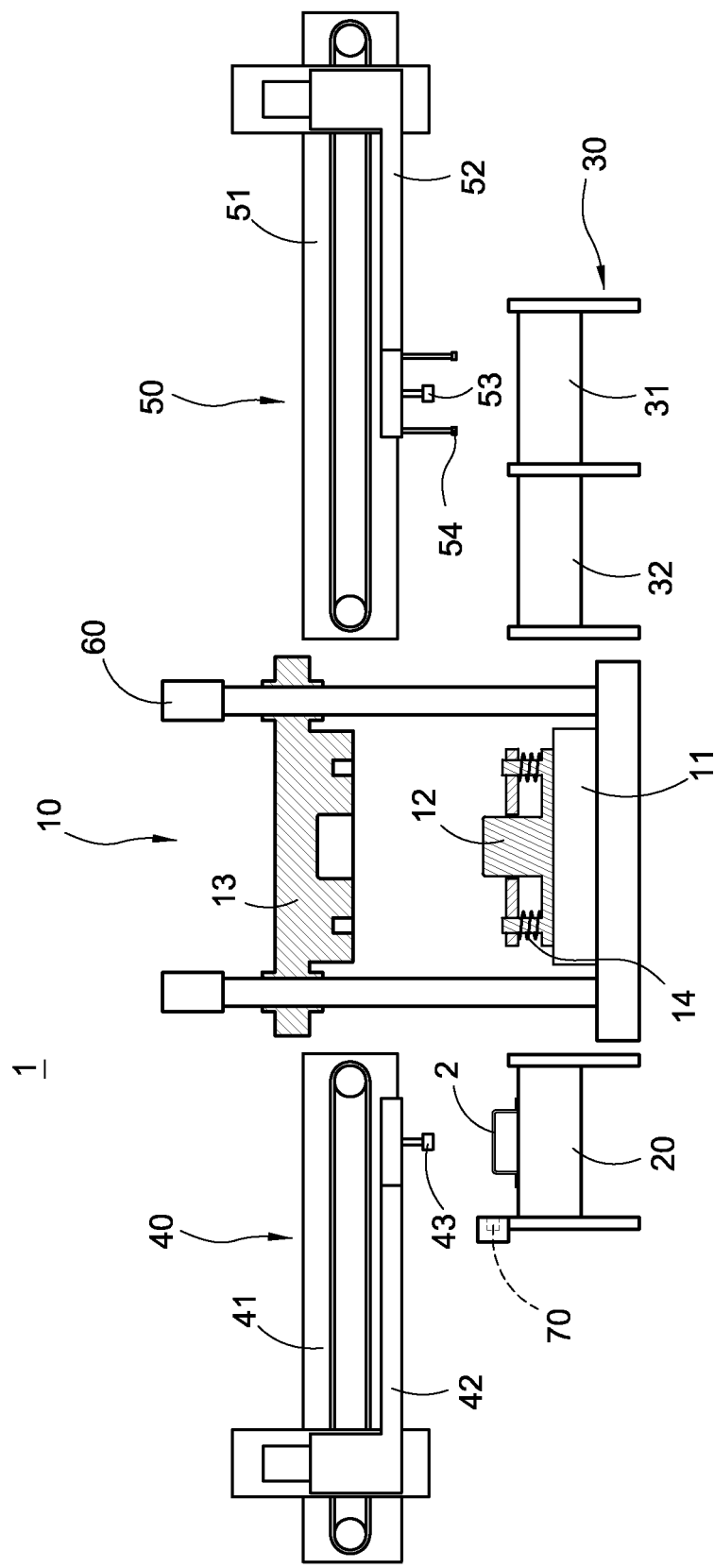
FIG. 1 is a plan view of the invention.
Figure 2:
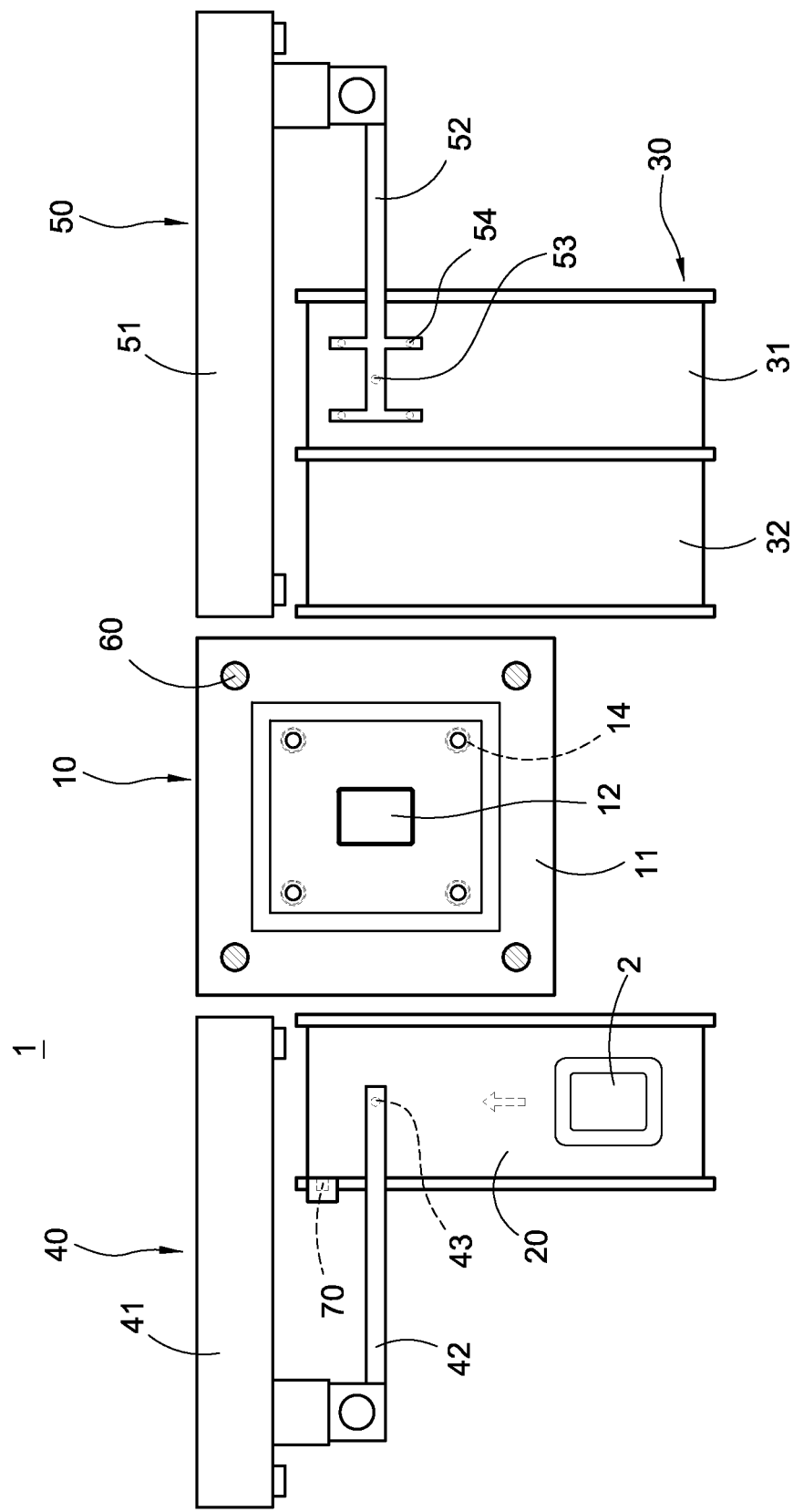
FIG. 2 is a top view of the invention.

Please refer to FIGS. 1 and 2. The machine 1 for automatically cutting and sorting boxes and remnants of the invention includes a cutting device 10, a first conveyor 20, a second conveyor 30, a first moving arm 40 and a second moving arm 50.

The cutting device 10 is driven by a hydraulic device 60. The cutting device 40 includes a platform 11, a lower mold 12 on the platform 11 and an upper mold 13 correspondingly over the lower mold 12. The lower mold 12 and the upper mold 13 are a male mold and a female mold, respectively. But it is not limited to this arrangement. A contrary arrangement of the upper and lower molds 12, 13 is available.

The cutting device 10 further includes a buffer element 14 such as a spring for providing a buffering effect to the two molds 12, 13.

The first conveyor 20 is disposed near one side of the platform 11 for conveying a box to be cut 2.

Figure 9:
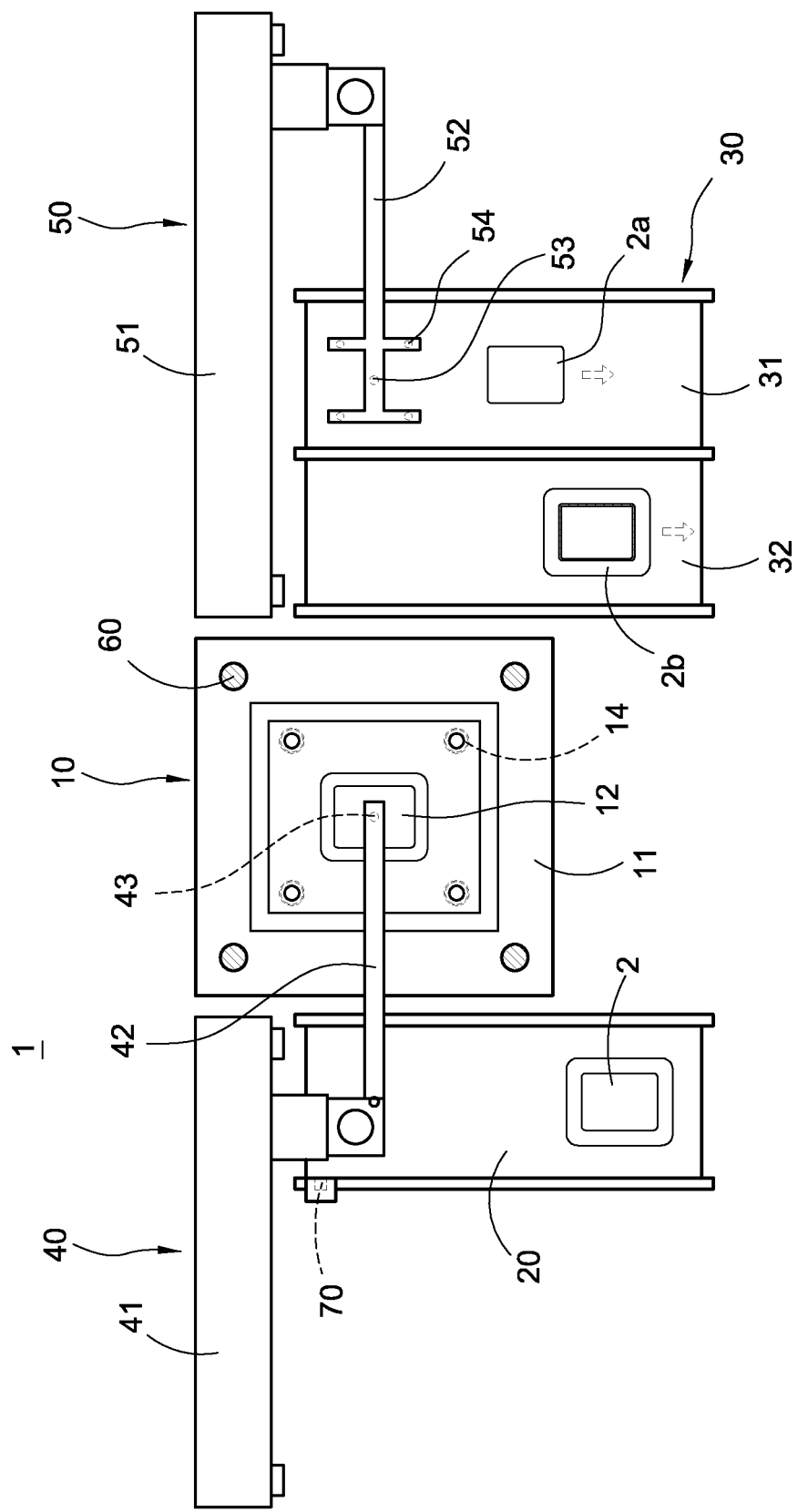
FIG. 9 is a schematic view showing the sorting of boxes and remnants.

The second conveyor 30 is disposed near the other side of the platform 11 for conveying a cut box 2a and remnants 2b (please refer to FIG. 9).

In this embodiment, the first conveyor 20 and the second conveyor 30 can be a conveyor belt. The second conveyor 30 is divided into a workpiece area 31 which conveys the cut box 2a and a scrap area 32 which conveys the remnants 2b.

The first moving arm 40 includes a first transmission 41 and a first robot hand 42 driven by the first transmission 41. The first robot hand 42 is used for moving the box to be cut 2 to a position between the lower mold 12 and the upper mold 13.

The second moving arm 50 includes a second transmission 51 and a second robot hand 52 driven by the second transmission 51. The second robot hand 52 is used for moving the cut box 2a and remnants 2b to the second conveyor 30. In this embodiment, the second robot hand 52 first releases the remnants 2b to the scrap area 32, and then releases the box 2a to the workpiece area 31. In practice, a reverse order is available.

In an embodiment of the invention, the first and second transmissions 41, 51 may be a linear servo motor transmission shaft. The first and second robot hand 42, 52 may be a vacuum robot hand. The first robot hand 42 has at least one feeding sucker 43 and the second robot hand 52 has at least one workpiece sucker 53 and at least one scrap sucker 54.

Preferably, the machine 1 may further include a sensor 70 disposed on one side of the first conveyor 20 and outside the platform 11. The sensor 70 is used for detecting whether the box has entered the working area to control the first conveyor 20.

Figure 3:
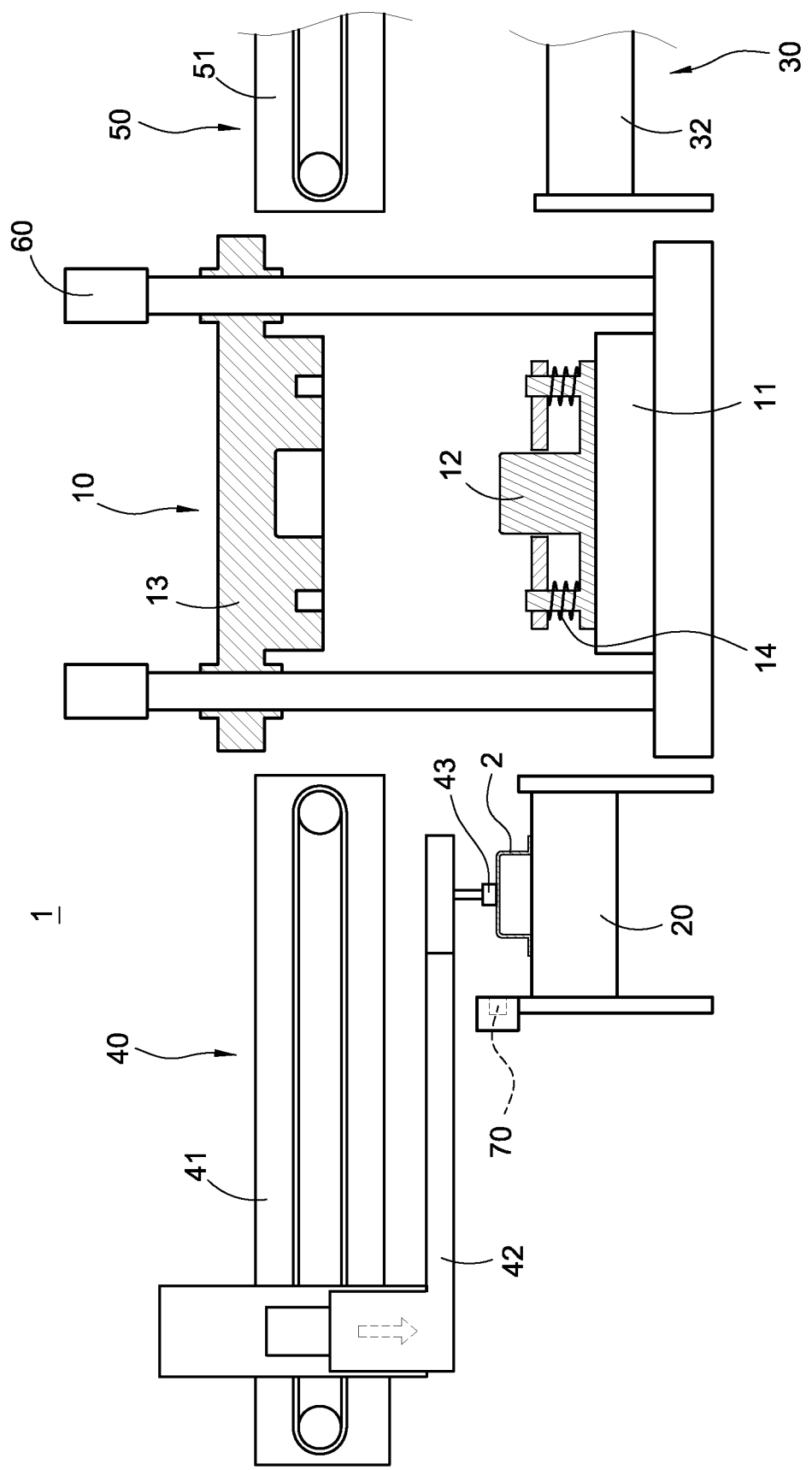
FIG. 3 is a schematic view showing a box to be cut is adhered by the first robot hand.
Figure 4:
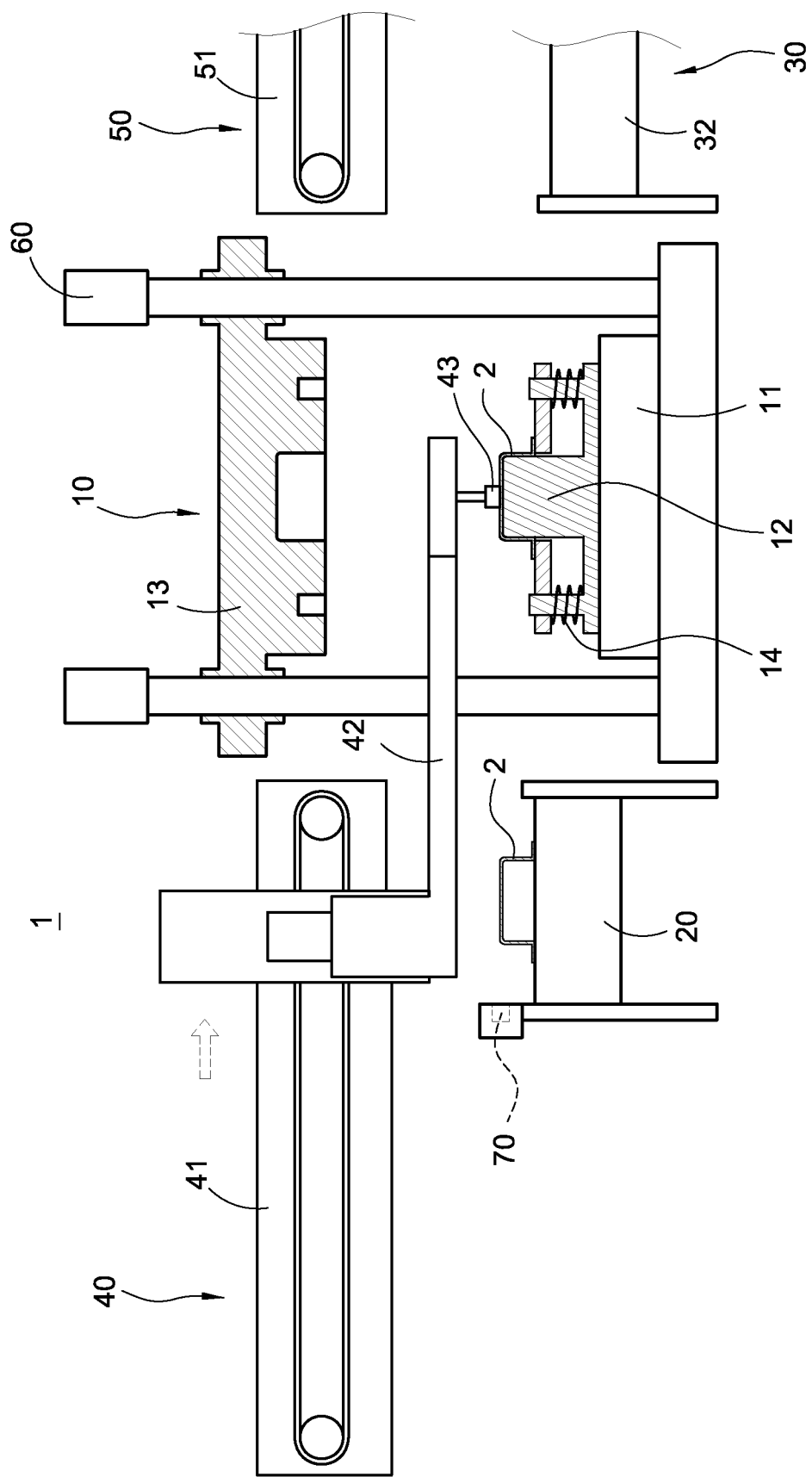
FIG. 4 is another schematic view showing the box to be cut is adhered by the first robot hand.

Please refer to FIG. 3. The first robot hand 42 is driven by the first transmission 41 to move toward the platform 11 for making the feeding sucker 43 suck the box to be cut 2. Please refer to FIG. 4, the first robot hand 42 moves toward the upper mold 13 and lower mold 12 and releases the box to be cut 2 onto the lower mold 12 (at this time, the next box to be cut 2 is moved forward).

Figure 5:
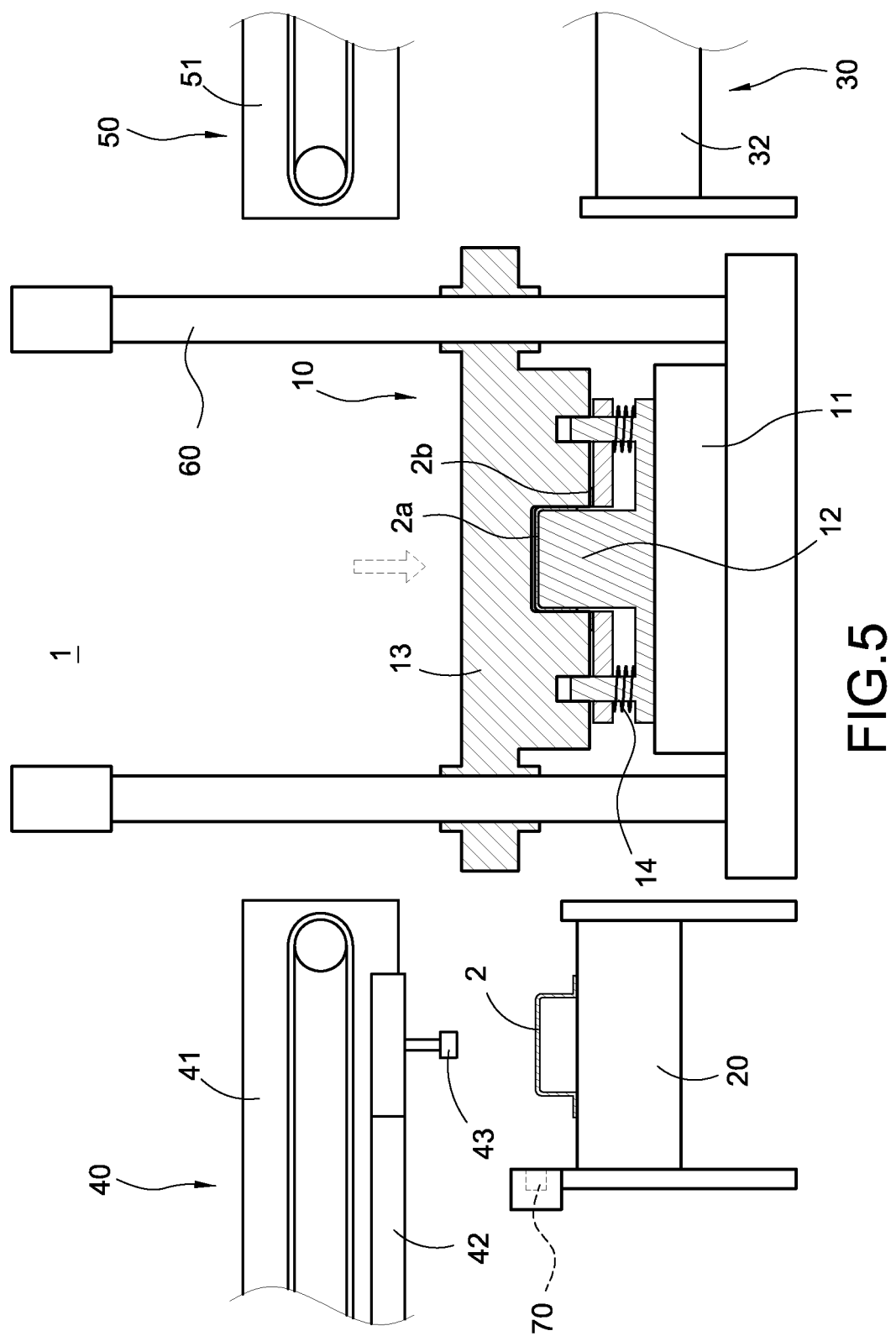
FIG. 5 is a schematic view showing the cutting action of the cutting device.

Please refer to FIG. 5. Until the first robot hand 42 has moved out of the platform 11, the upper mold 13 and the lower mold 12 are driven to start cutting. The box to be cut 2 is cut to be a cut box 2a and remnants 2b.

Figure 6:
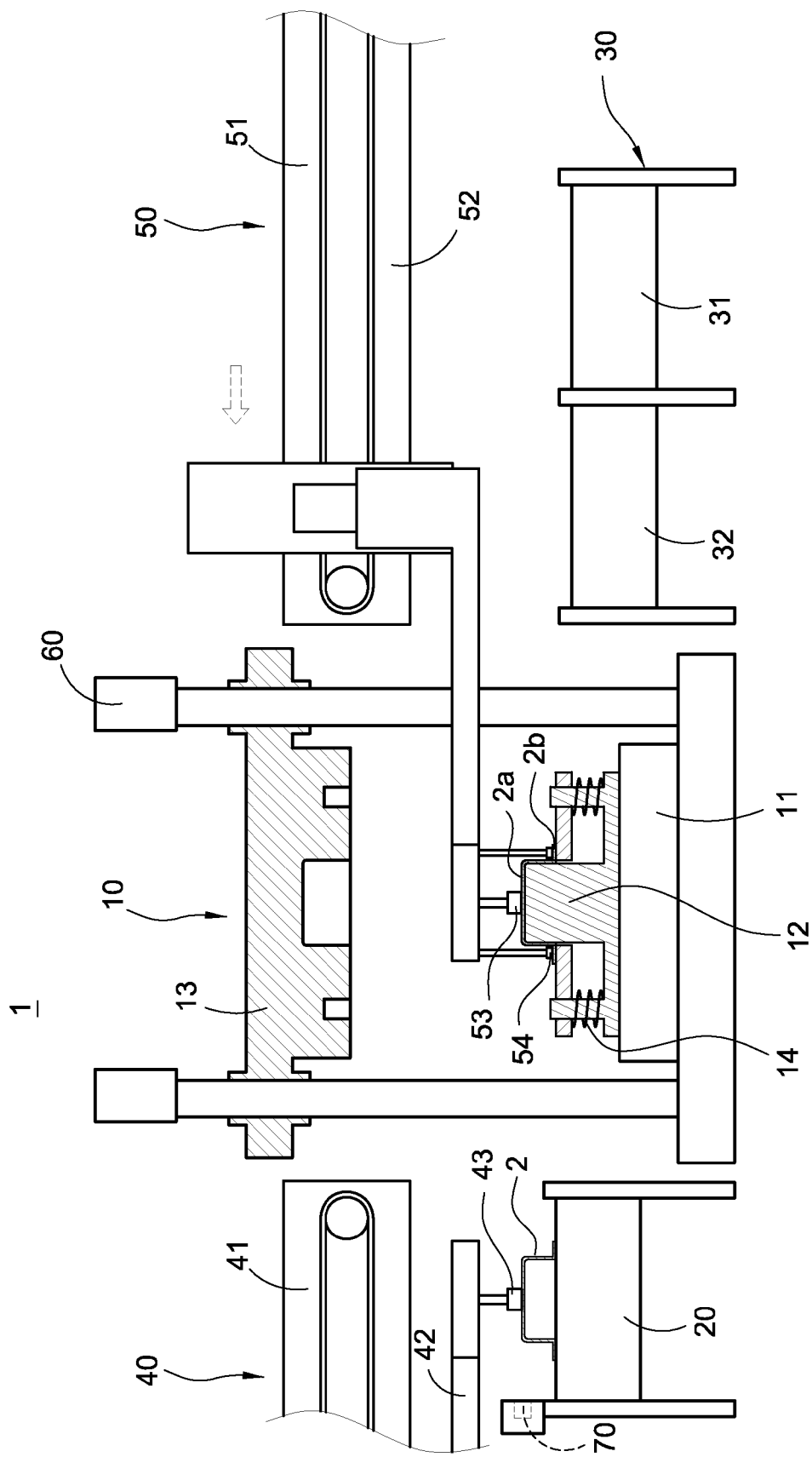
FIG. 6 is a schematic view showing a cut box and remnants are adhered by the second robot hand.

Please refer to FIG. 6. After cutting, the second robot hand 52 is driven by the second transmission 51 to move toward the platform 11 for making the workpiece sucker 53 and scrap sucker 54 respectively suck the cut box 2a and the remnants 2b. After that, the second robot hand 42 moves the cut box 2a and remnants 2s out of the platform 11 and stays above the second conveyor 30 (at this time, the first robot hand 42 can suck the next box to be cut 2).

Figure 7:
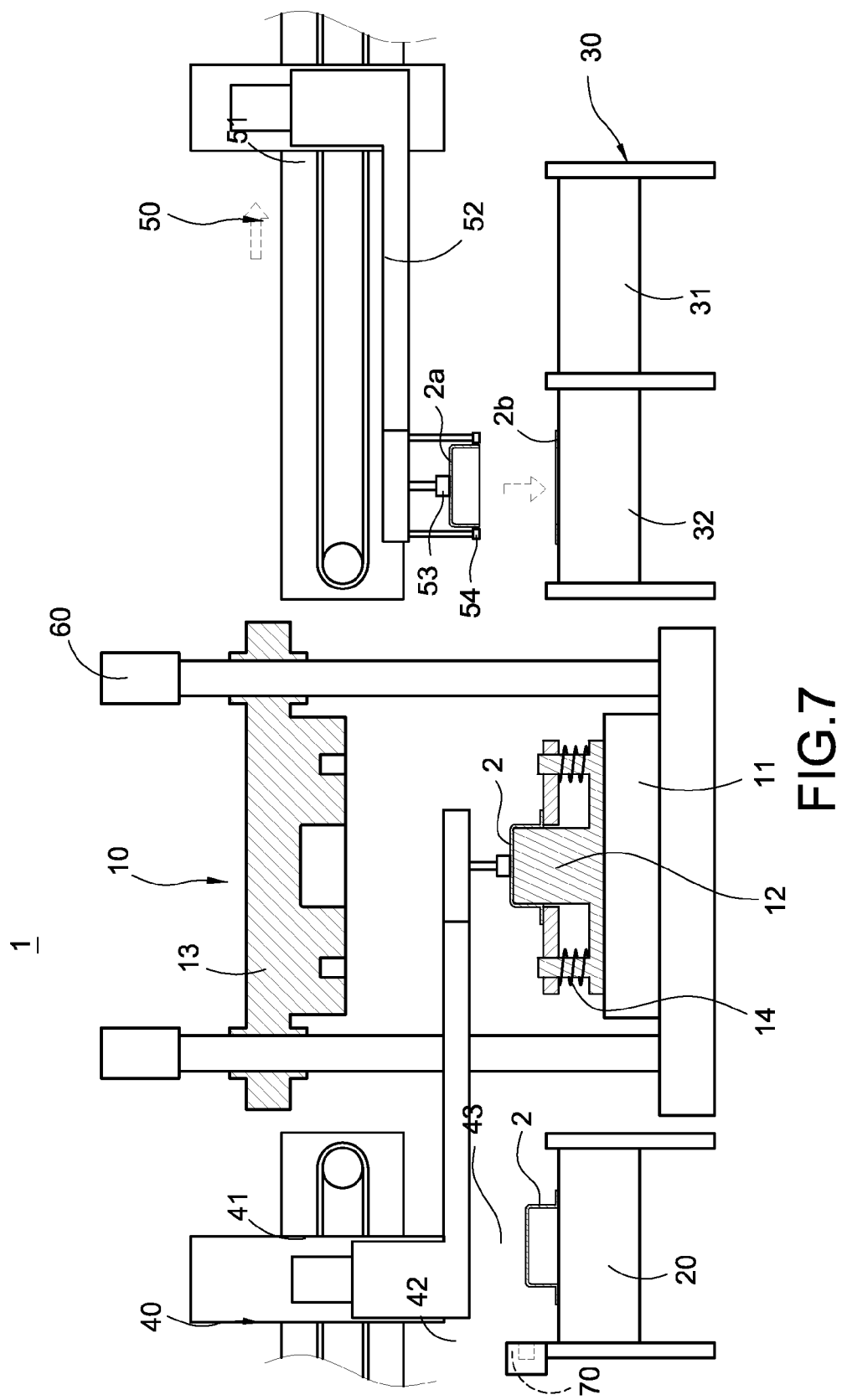
FIG. 7 is another schematic view showing the cut box and remnants are adhered by the second robot hand.

As shown in FIG. 7, the second robot hand 52 releases the remnants 2b to the scrap area 32. On the other hand, the box 2a is stilled adhered to the workpiece sucker 53 to stay on the second robot hand 52. When the second robot hand 52 has moved out of the platform 11, the first robot hand 42 can feed another box to be cut 2 onto the platform 11 for shortening processing time.

Figure 8:
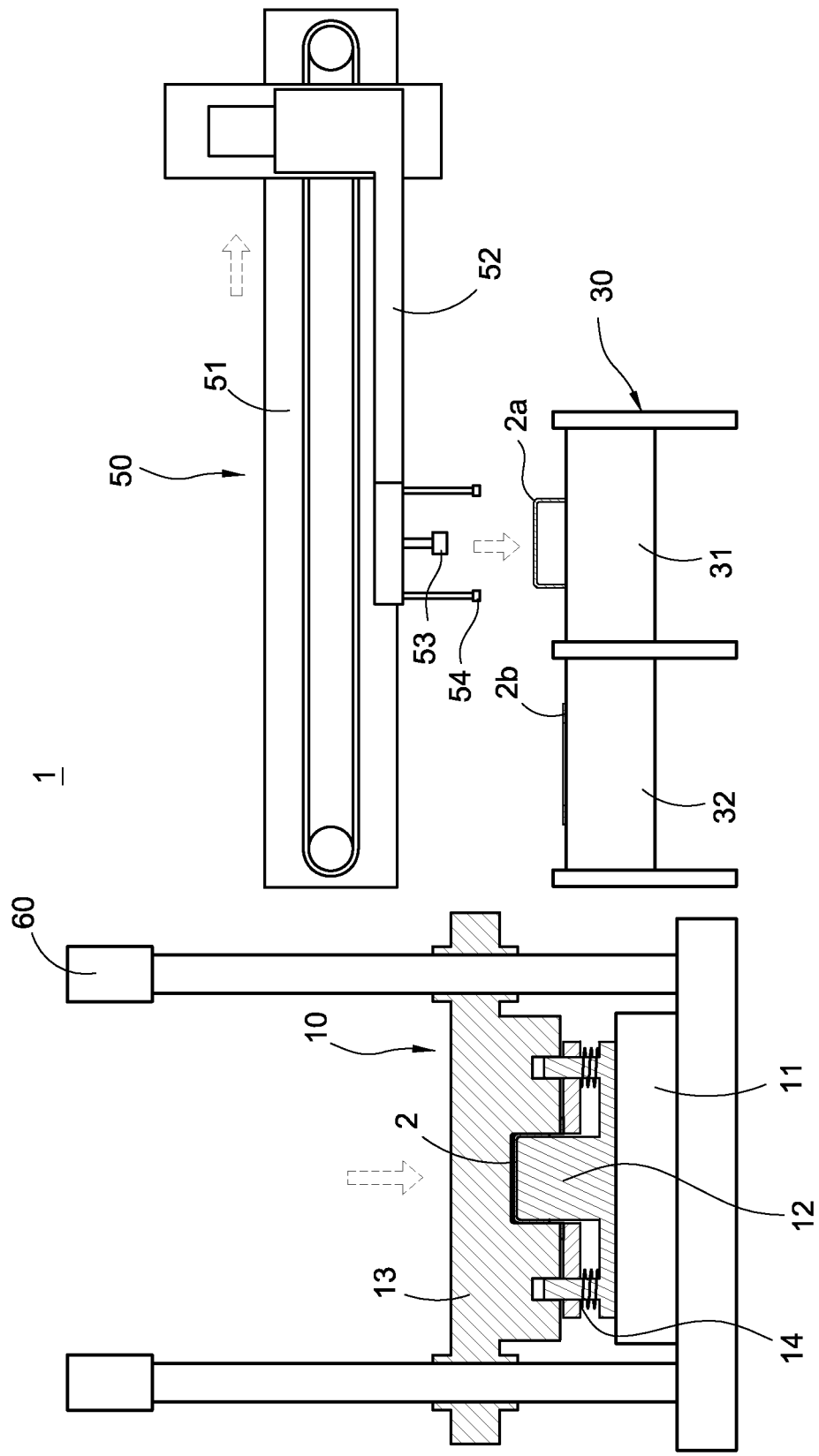
FIG. 8 is a schematic view showing the cut box and remnants are released by the second robot hand.

Please refer to FIG. 8. The second robot hand 52 will keep moving outward to release the box 2a to the workpiece area 31. Thus the box 2a and remnants 2b can be unloaded to the second conveyor 30.

Please refer to FIG. 9. After cutting, the remnants 2b will be released to the scrap area 32. Additionally, the box 2a will be released to the workpiece area 32 so that the box 2a and remnants 2b can be sorted and collected.

Figure 10:
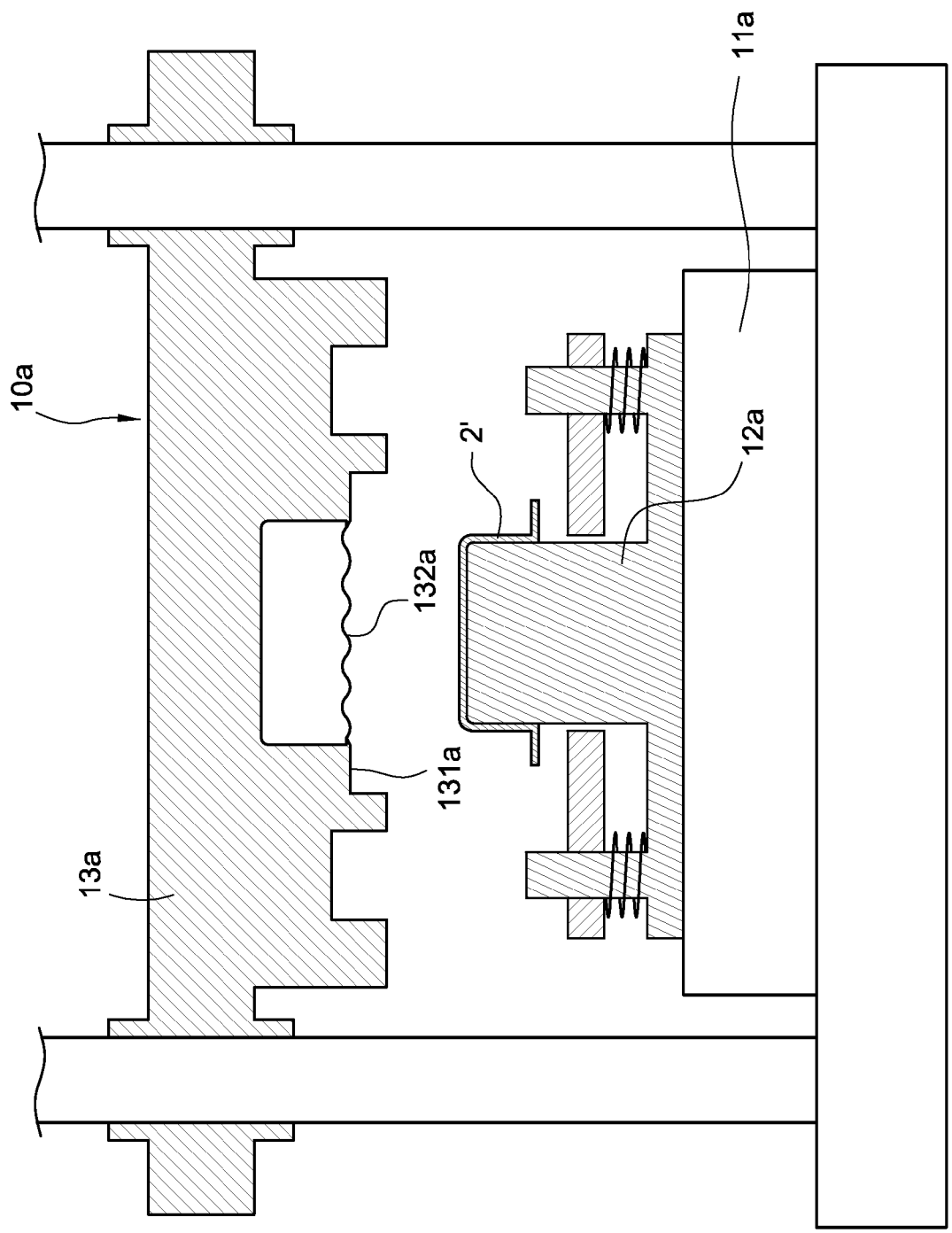
FIG. 10 is another embodiment of the cutting device.
Figure 11:
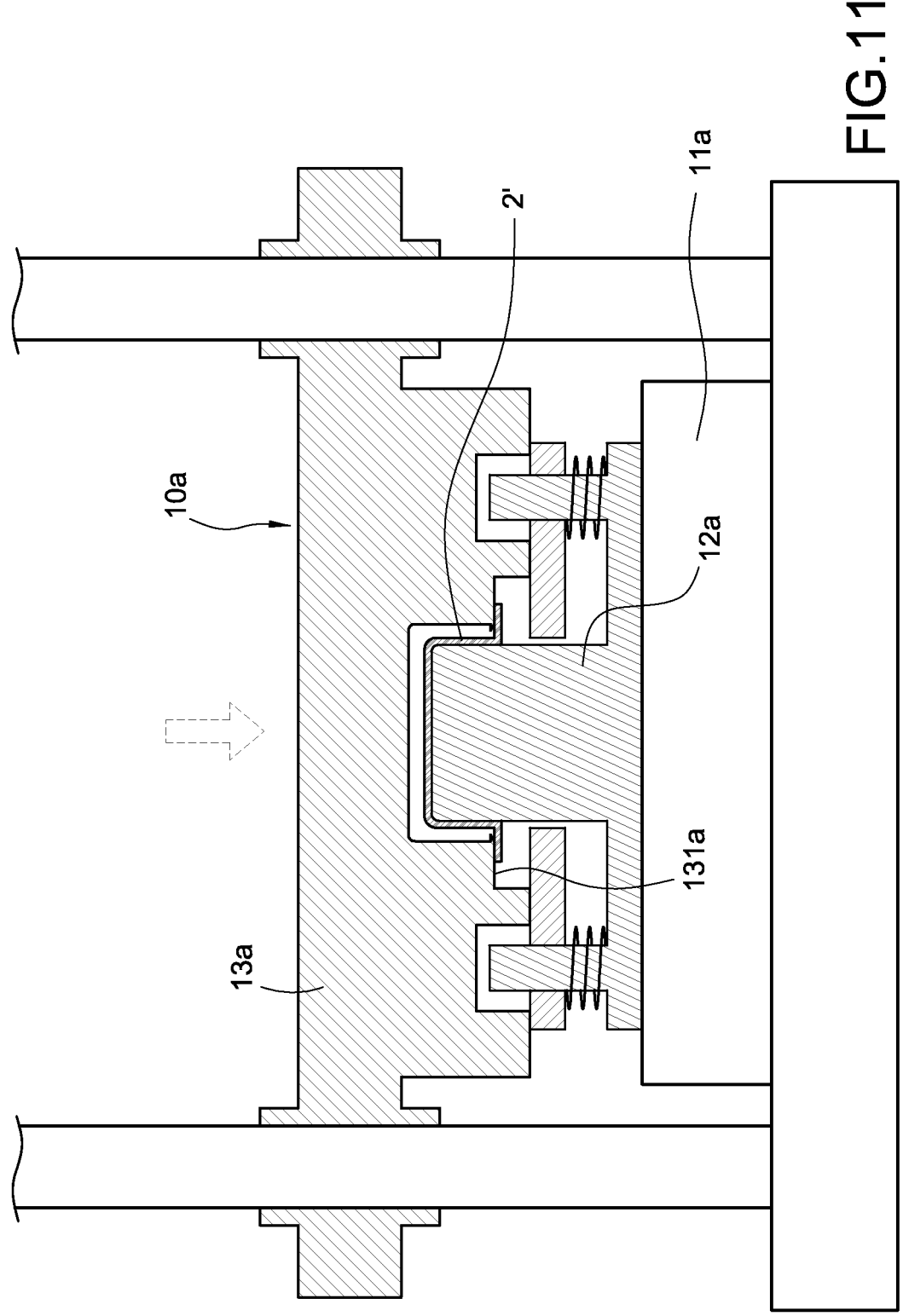
FIG. 11 is a schematic view showing the cutting action of the cutting device shown in FIG. 10.

Please refer to FIGS. 10-12. In this embodiment, the cutting device 10a includes a platform 11a, a lower mold 12a and an upper mold 13a. This embodiment differs from the above embodiment by the platform 11a being able to move forward, rearward, leftward and rightward. This can improve the cutting effect.

In this embodiment, the upper mold 13a may be formed with a step 131a. Additionally, the upper mold 13a has a waved edge 132a to make the box to be cut 2' cut to be a box 2a' with a waved edge.

While the forgoing is directed to preferred embodiments of the present invention, other and further embodiments of the invention may be devised without departing from the basic scope thereof. As such, the appropriate scope of the invention is to be determined according to the claims.

What is claimed is:

1. A machine for automatically cutting and sorting boxes and remnants, comprising:
    a cutting device, comprising a platform, a lower mold on the platform and an upper mold correspondingly over the lower mold;
    a first conveyor, disposed near one side of the platform for conveying a box to be cut;
    a second conveyor, disposed near the other side of the platform for conveying a cut box and remnants;
    a first moving arm, comprising a first transmission and a first robot hand driven by the first transmission for moving the box to be cut to a position between the lower mold and the upper mold; and
    a second moving arm, comprising a second transmission and a second robot hand driven by the second transmission for moving the cut box and remnants to the second conveyor.

2. The machine of claim 1, wherein the platform has at least one buffer element.

3. The machine of claim 1, wherein the lower mold is a male mold and the upper mold is a female mold.

4. The machine of claim 1, wherein the cutting device is driven by a hydraulic device.

5. The machine of claim 1, wherein each of the first conveyor and the second conveyor is a conveyor belt.

6. The machine of claim 1, wherein the second conveyor is divided into a workpiece area for conveying the cut box and a scrap area for conveying the remnants.

7. The machine of claim 1, wherein each of the first and second transmissions is a linear servo motor transmission shaft.

8. The machine of claim 6, wherein each of the first and second robot hands is a vacuum robot hand.

9. The machine of claim 8, wherein the first robot hand has at least one feeding sucker and the second robot hand has at least one workpiece sucker and at least one scrap sucker.

10. The machine of claim 9, wherein the workpiece sucker sucks the cut box to move to the workpiece area and the scrap sucker sucks the remnants to move to the scrap area.

11. The machine of claim 1, further comprising a sensor disposed on one side of the first conveyor and outside the platform.

12. The machine of claim 1, wherein the upper mold is formed with a step.

13. The machine of claim 1, wherein the upper mold is formed with a waved edge.

* * * * *